United States Patent
Wang et al.

(10) Patent No.: US 8,256,725 B2
(45) Date of Patent: Sep. 4, 2012

(54) SUPPORT STAND FOR FLAT-PANEL MONITOR AND ELEVATING SUPPORT FOR SUPPORT STAND

(75) Inventors: Jin-Xin Wang, Shenzhen (CN); Jian Li, Shenzhen (CN); Zhi-Guo Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/292,199

(22) Filed: Nov. 9, 2011

(65) Prior Publication Data
US 2012/0049016 A1    Mar. 1, 2012

Related U.S. Application Data

(62) Division of application No. 12/195,438, filed on Aug. 21, 2008, now Pat. No. 8,070,115.

(30) Foreign Application Priority Data

Dec. 27, 2007  (CN) .......................... 2007 1 0203495

(51) Int. Cl.
- *F16M 11/00* (2006.01)
- *A47G 23/02* (2006.01)
- *A47G 29/00* (2006.01)
- *E04G 3/00* (2006.01)
- *A47F 5/12* (2006.01)

(52) U.S. Cl. ...................... 248/157; 248/372.1; 248/917; 248/918; 248/919; 248/920; 248/921; 248/922; 248/923; 248/371; 248/284.1; 248/133; 248/149; 248/280.11; 248/292.11; 248/292.13

(58) Field of Classification Search .................. 248/157, 248/372.1, 917–923, 371, 284.1, 183.3, 281.11, 248/133, 136, 150, 149, 280.11, 292.11, 248/292.13
See application file for complete search history.

(56) References Cited

U.S. PATENT DOCUMENTS

| | | | | |
|---|---|---|---|---|
| 6,592,090 | B1 * | 7/2003 | Li | 248/284.1 |
| 7,401,717 | B2 * | 7/2008 | Chen | 224/413 |
| 7,510,155 | B2 * | 3/2009 | Huang et al. | 248/278.1 |
| 7,726,616 | B2 * | 6/2010 | Zhang et al. | 248/284.1 |

(Continued)

FOREIGN PATENT DOCUMENTS

CN  2504675 Y  8/2002

(Continued)

*Primary Examiner* — Terrell McKinnon
*Assistant Examiner* — Christopher Garft
(74) *Attorney, Agent, or Firm* — Altis Law Group, Inc.

(57) ABSTRACT

A support stand comprises an elevating support; a monitor bracket; and a support member; the elevating support comprising a first and a second chasses, a pluralities of supporting blocks, an elastic member, a first and a second pivot subassemblies, a resisting member, a roller, and a pressing block; the first chassis comprises a resisting wall opposite to the second pivot subassembly; the elastic member is between the resisting wall and the pressing block, two ends of the elastic member resist the resisting wall and the pressing block, the first pivot subassembly is fixed to the plurality of supporting blocks connected to first ends of the chasses, the second pivot subassembly is fixed to the plurality of supporting blocks connected to second ends of the chasses; the resisting member is connected to the plurality of supporting blocks, the roller is assembled with the pressing block and rotatable against the resisting member.

12 Claims, 9 Drawing Sheets

U.S. PATENT DOCUMENTS

| | | | | |
|---|---|---|---|---|
| 7,770,856 B2 * | 8/2010 | Depay | ........................ | 248/284.1 |
| 7,810,773 B2 * | 10/2010 | Chi | ............................ | 248/278.1 |
| 8,011,632 B2 * | 9/2011 | Wang et al. | ................. | 248/284.1 |
| 8,070,114 B2 * | 12/2011 | Chen | ............................. | 248/121 |
| 2006/0032998 A1 * | 2/2006 | Depay | ........................ | 248/291.1 |

FOREIGN PATENT DOCUMENTS

| | | |
|---|---|---|
| CN | 2566418 Y | 8/2003 |
| CN | 2819385 Y | 9/2006 |
| JP | 08-161077 A | 6/1996 |

\* cited by examiner

SUPPORT STAND FOR FLAT-PANEL MONITOR AND ELEVATING SUPPORT FOR SUPPORT STAND

CROSS-REFERENCE TO RELATED APPLICATION

The present application is a divisional application of U.S. patent application Ser. No. 12/195,438, filed on Aug. 21, 2008, which claims all benefits accruing under 35 U.S.C. §119 from CN 200710203495.8, filed on Dec. 27, 2007, the contents of which are hereby incorporated by reference.

BACKGROUND OF THE INVENTION

1. Field of the Invention

The present disclosure relates generally to support stands and, particularly, to a support stand for a flat-panel display body.

2. Discussion of the Related Art

Flat-panel display bodies, such as liquid crystal display (LCD) monitors, offer advantages, over cathode ray tubes (CRTs) such as a greatly reduced size, and better image quality. Furthermore, because of the light weight of the flat-panel display body, the viewing angle and the height of the flat-panel display body can be adjusted without moving a base of a support stand of the flat-panel display body.

A typical support stand generally includes a monitor bracket for attaching to the flat-panel display body, a rotatable bracket for fixing the monitor bracket, an elevating support, a support member, and a base member for mounting the support member. The rotatable bracket is rotatably hinged to an end of the elevating support by a first hinge assembly. The support member is hinged to another end of the elevating support by a second hinge assembly.

A viewing angle of the flat-panel display body mounted on the typical elevating support can be adjusted by rotating the rotatable bracket relative to the elevating support. A height of the flat-panel display body can be adjusted by rotating the elevating support relative to the support member. A frictional force between components of the elevating support balances a gravitational force of the flat-panel display body, thus the flat-panel display body may be retained at a desired position. However, the components of the elevating support may become loose when the elevating support is used for a long period of time. As a result, the flat-panel display body may not remain stable at the height selected by a user. Therefore, the typical elevating support may have a relatively short usage life.

Therefore, an improved support stand for a flat-panel display body is desired to overcome the above-described shortcomings.

SUMMARY

In one aspect, a support stand for a flat-panel display body includes an elevating support, a monitor bracket, and a support member. The elevating support includes a first chassis, a second chassis, a plurality of supporting blocks for connecting end portions of the first chassis and the second chassis, an elastic member, a first pivot subassembly, and a second pivot subassembly. The monitor bracket is rotatably connected to the first pivot subassembly. The support member is rotatably connected to the second pivot subassembly. The elastic member is capable of exerting a rebound force on two of the first chassis, the second chassis, and the supporting blocks. The first and second pivot subassembly are fixed to the supporting blocks. The monitor bracket and the support member are rotatably connected to the first and second pivot subassembly correspondingly.

In another aspect, an elevating support, used for a support stand of a flat-panel display body, includes a first chassis including end portions, a second chassis including end portions, a plurality of supporting blocks, an elastic member, a first pivot subassembly, a second pivot subassembly, two rotatable brackets, and a connecting base. The supporting blocks are configured for connecting end portions of the end portions of the first chassis and the second chassis. The elastic member is capable of exerting a rebound force on two of the first chassis, the second chassis, and the supporting blocks to make the first chassis and the second chassis tend to elevate. The first pivot subassembly is fixed to the supporting blocks connected to a first end portion of the first chassis and the second chassis. The second pivot subassembly is fixed to the supporting blocks connected to a second end portion of the first chassis and the second chassis opposite to the first end portions. The rotatable brackets are rotatably connected to the first pivot subassembly. The connecting base is rotatably connected to the second pivot subassembly.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present support stand for a flat-panel display body. Moreover, in the drawings, like reference numerals designate corresponding parts throughout the several views.

DETAILED DESCRIPTION OF THE EMBODIMENTS

Figure 1:
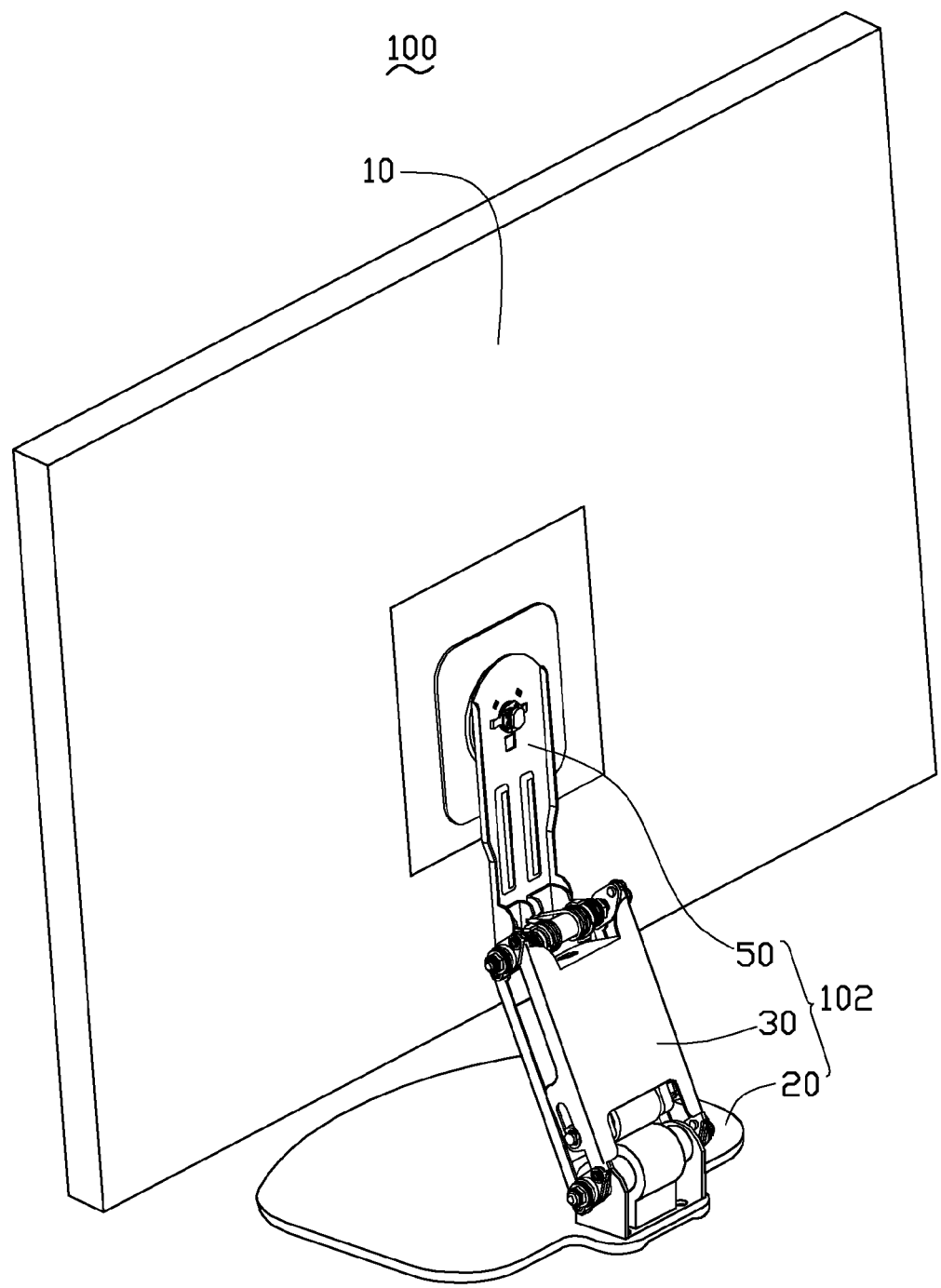
FIG. 1 is an isometric view of a flat-panel display body having a support stand in accordance with an exemplary embodiment of the present application.

Reference will now be made to the drawings to describe the embodiments of the present support stand and elevating support in detail. Referring to FIG. 1, a flat-panel display body 100 includes a display body 10 and a stand support 102. The stand support 102 includes a support member 20, an elevating support 30, and a monitor bracket 50 for holding the flat-panel display body. An end of the elevating support 30 is connected to the support member 20 and another end of the elevating support 30 opposite to the support member 20 is rotatably attached to the monitor bracket 50.

Figure 2:
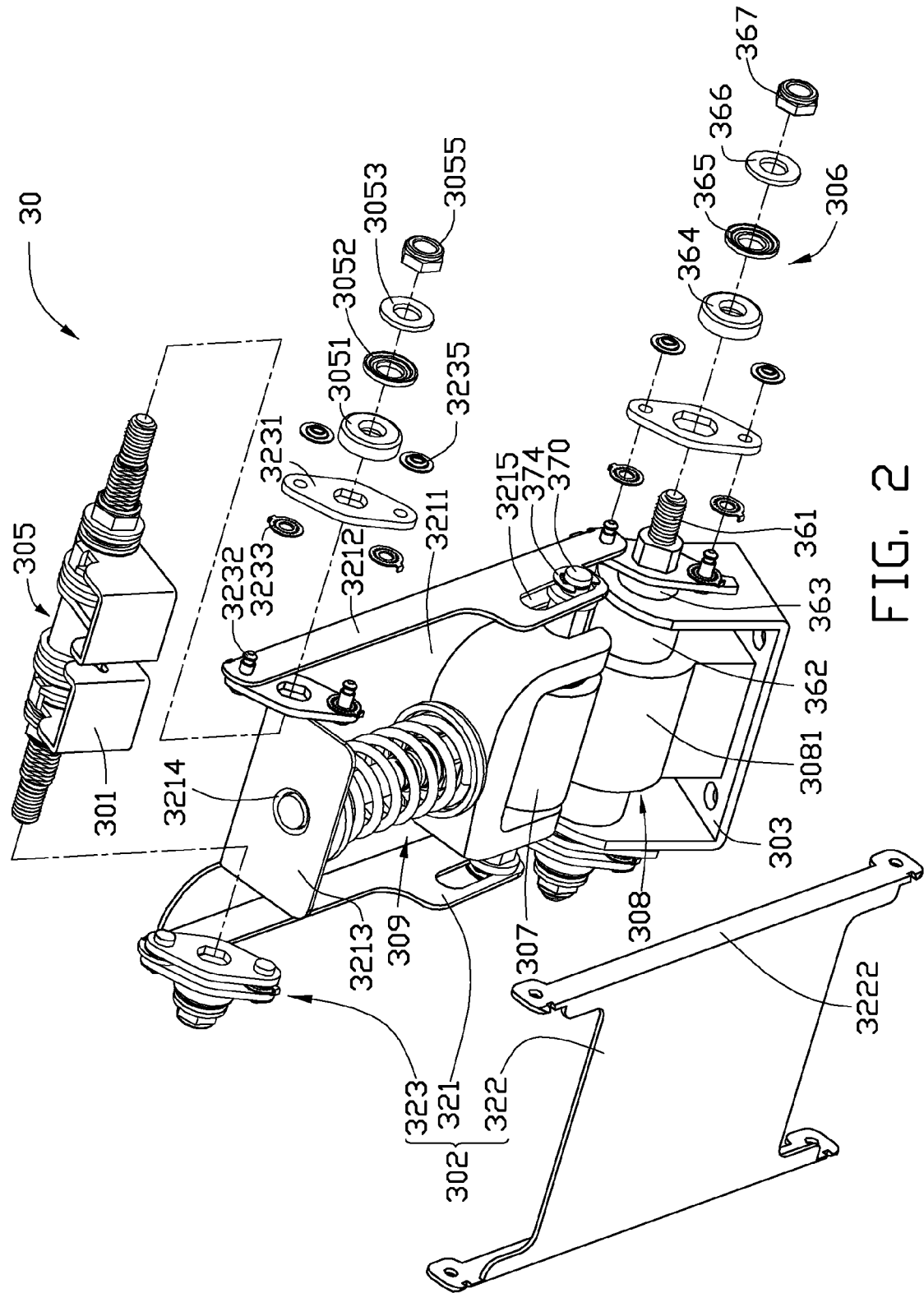
FIG. 2 is a partially disassembled, isometric view of an elevating support of the support stand in FIG. 1.

Referring to FIG. 2, the elevating support 30 includes a pair of rotatable brackets 301, a bracket subassembly 302, a connecting base 303, a first pivot subassembly 305, a second pivot subassembly 306, a roller 307, a resisting member 308, and an elastic subassembly 309. A first end of the bracket subassembly 302 is rotatably connected to the rotatable brackets 301 via the first pivot subassembly 305. A second end opposite to the first end of the bracket subassembly 302 is rotatably connected to the connecting base 303 via the second pivot subassembly 306.

Figure 3:
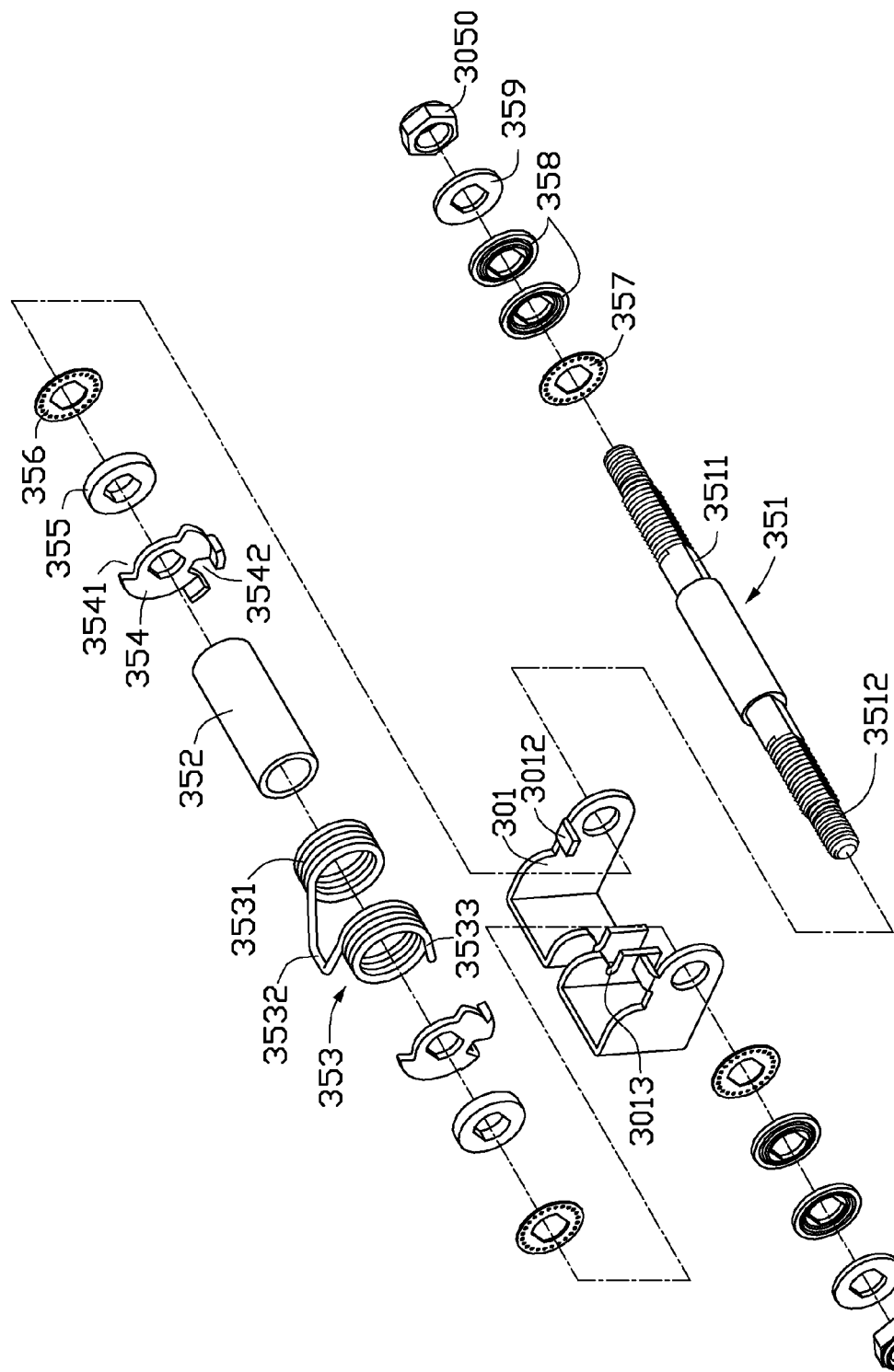
FIG. 3 is an exploded, isometric view of a pair of rotatable brackets and a first pivot subassembly in FIG. 2.

Referring also to FIG. 3, each of the pair of rotatable brackets 301 forms a restricting block 3012 and a notch 3013. Each of the pair of rotatable brackets 301 is rotatably connected to the first pivot subassembly 305. The monitor bracket 50 is fixed to each of the pair or rotatable brackets 301. The rotatable brackets 301 may be integrally formed. The number of the rotatable brackets 301 may be more than two.

The bracket subassembly 302 includes a first chassis 321, a second chassis 322, and four supporting assemblies 323 (a first supporting assembly, a second supporting assembly, a third supporting assembly, and a fourth supporting assembly). The first chassis 321 includes a flat base 3211, two side walls 3212 extending perpendicularly from opposite sides of the flat base 3211, and a resisting wall 3213 defining a through hole 3214. The resisting wall 3213 extends perpendicularly from a top end of the flat base 3211 and perpendicularly relative to the side walls 3212. Each of the side walls 3212 defines a guiding slot 3215.

The second chassis 322 is similar to the first chassis 321 except that the second chassis 322 does not include a resisting wall, and side walls 3222 of the second chassis 322 does not define guiding slots.

Each of the supporting subassemblies 323 includes a pair of supporting blocks 3231, a pair of pivot shafts 3232, four tab washers 3233, a pair of resilient rings 3235.

Each of the supporting blocks 3231 defines two pivot holes (not labeled) adjacent to two end portions and a fixing hole (not labeled) in a middle portion. Each of the supporting subassemblies 323 is rotatably attached to ends of the first chassis 321 and the second chassis 322 via the two pivot holes of the supporting blocks 323 and the pair of pivot shafts 3232. Two supporting subassemblies 323 are fixed to the first pivot subassembly 305 via each of the fixing hole of the two supporting blocks 3231. Remaining two supporting subassemblies 323 are fixed to the second pivot subassembly 306 via each of the fixing hole of the remaining two supporting blocks 3231.

The connecting base 303 is substantially U-shaped. The connecting base 303 includes two parallel side walls (not labeled). Each side wall of the connecting base 303 defines a through hole (not shown).

The first pivot subassembly 305 includes a first pivot shaft 351, a sleeve 352 sleeved on the first pivot shaft 351, a torsion spring 353 sleeved on the sleeve 352, and two first hinge subassemblies (not labeled). The sleeve 352 is sleeved on a middle portion of the first pivot shaft 351. The torsion spring 353 is sleeved on the sleeve 352. The first hinge subassemblies are attached to opposite shaft portions of the first pivot shaft 351 correspondingly. Each of the first hinge subassemblies includes a limiting washer 354, a first pressing washer 355, a first protecting washer 356, a second protecting washer 357, two first resilient rings 358, a first washer 359, a adjustable nut 3050, a second resilient ring 3051, a second pressing washer 3052, a second washer 3053, and a nut 3055.

The first pivot shaft 351 is substantially cylindrical, and includes two shaft portions 3511 at opposite ends. Each of the two shaft portions 3511 defines a thread (not labeled) on a distal end portion. Each of the two shaft portions 3511 is non-circular. In this embodiment, a cross-section taken perpendicular to a central axis of each of the two shaft portions 3511 is double D-shaped, thereby forming two flat surfaces. Thus, the thread is discontinuous.

The torsion spring 353 includes two torsion portions (not labeled), an n-shaped connecting portion 3532 for connecting each of the two torsion portions. Each of the two torsion portions of the torsion spring 353 includes a latching end 3533.

The limiting washer 354 defines a deformed hole (not labeled) in a middle portion of the limiting washer 354. A shape and a size of the deformed hole correspond to a cross-section of each of the two shaft portions 3511. The limiting washer 354 defines a restricting groove 3541 and a latching groove 3542 on a periphery.

The second pivot subassembly 306 includes a second pivot shaft 361 and two second hinge subassemblies (not labeled). The resisting member 308 is sleeved on a middle portion of the second pivot shaft 361. The second hinge subassemblies are attached to opposite shaft portions of the second pivot shaft 361. Each of the second hinge subassembly includes a block 362, two resilient rings 363, 364, a resilient washer 365, a washer 366, and a nut 367.

Figure 4:
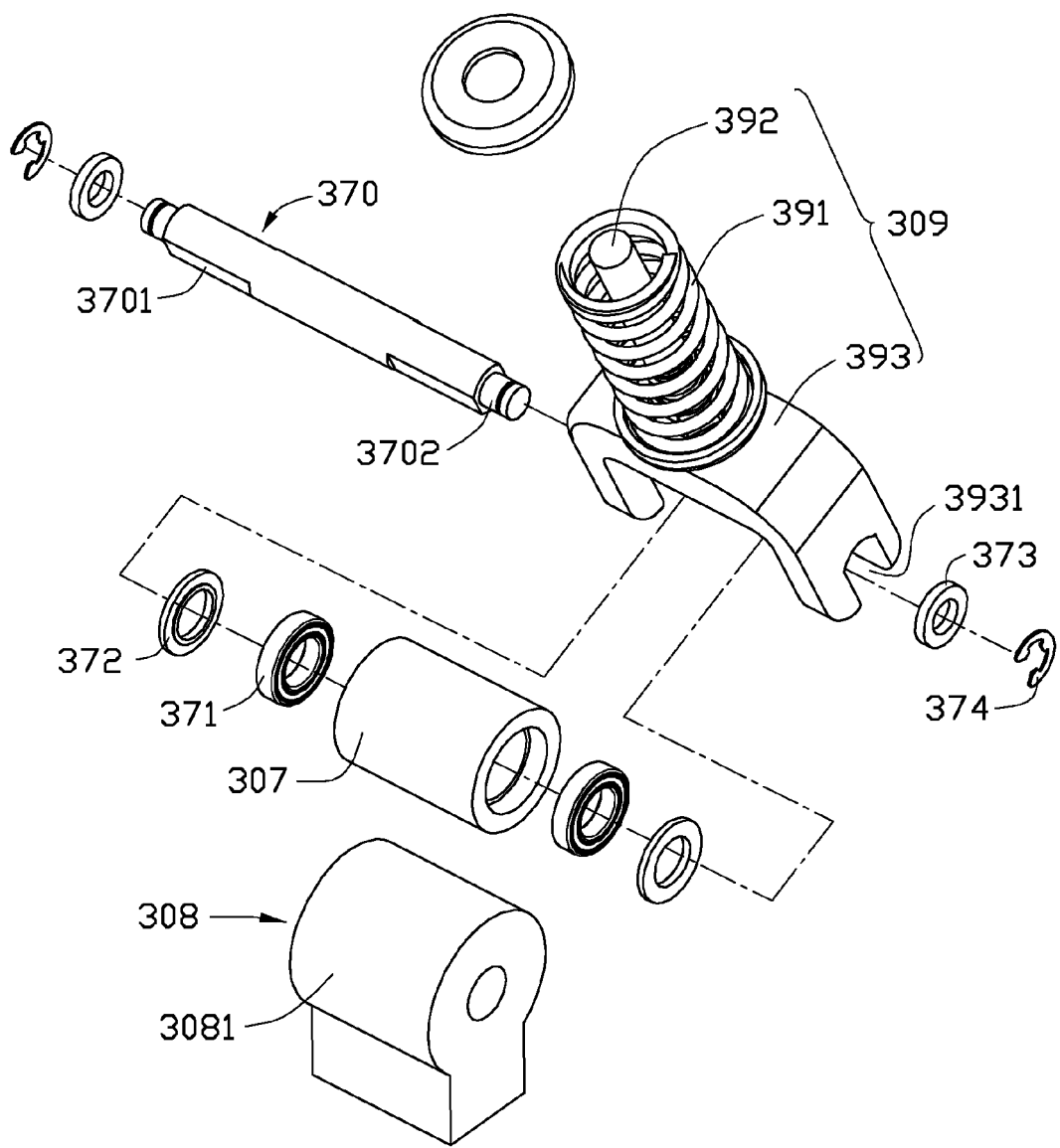
FIG. 4 is an exploded, isometric view of an elastic subassembly, a roller, a shaft, a resisting portion of FIG. 2.
Figure 5:
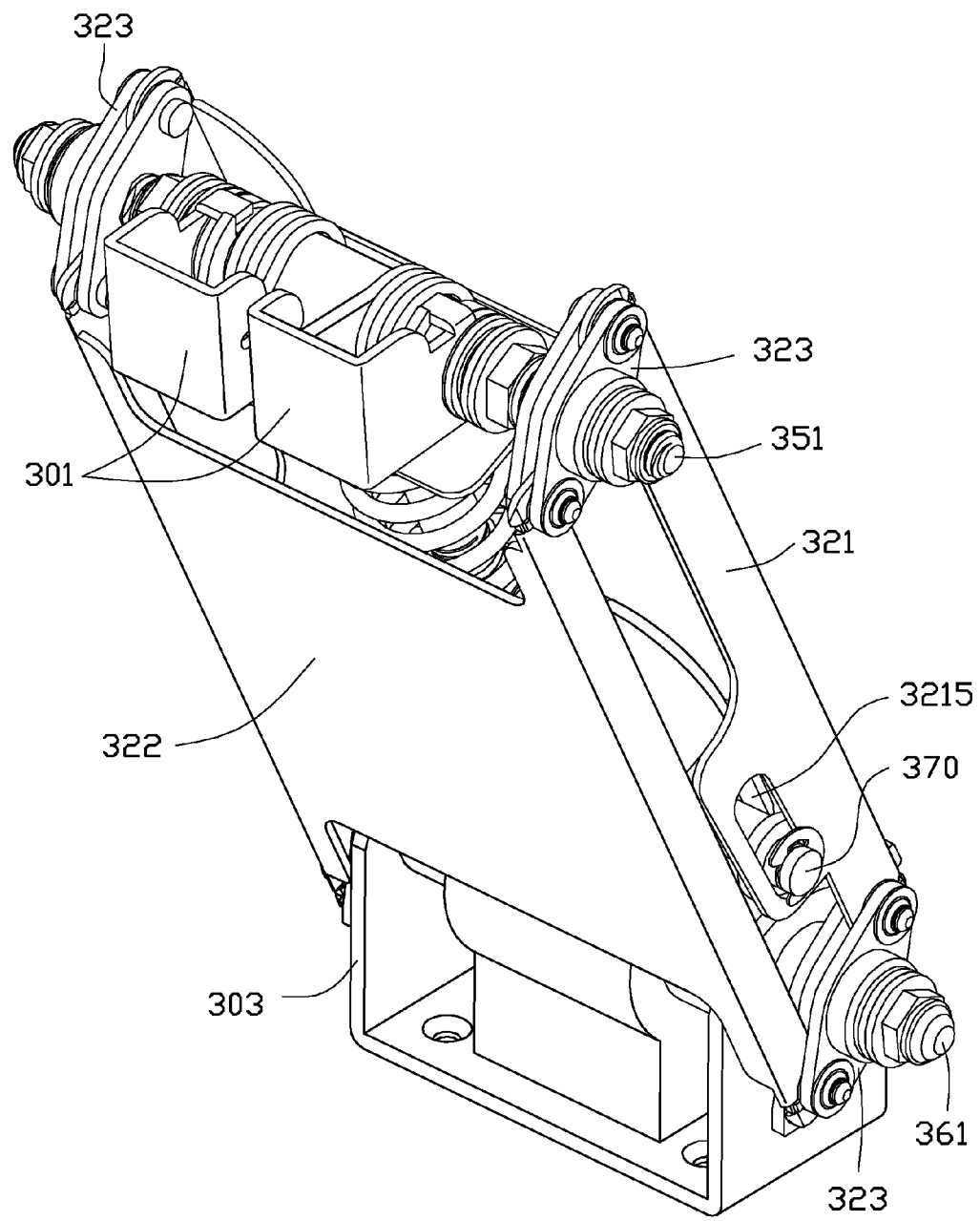
FIG. 5 is an assembled, isometric view of the elevating support of FIG. 2.

Referring to FIG. 2 and FIG. 4, the roller 307 is substantially a hollow cylinder. The roller 307 is rotatably disposed between the two guiding slots 3215 of the first chassis 321 via a shaft 370. The shaft 370 is substantially cylindrical, and includes two latching ends 3701 at opposite ends. The latching end 3701 forms a restricting pole 3702 on a distal end portion. The latching end 3701 is non-circular, and in a preferred embodiment has a double D shape. The roller 307 is sleeved on a middle portion of the shaft 370. Each end of the shaft 370 is configured to extend through a bearing 371, a first washer 372, a holding groove 3931 of a pressing block 393, a second washer 373, and the guiding slot 3215 of the first chassis 321 in that order. A clip ring 374 is configured to engage in a latching groove of the restricting pole 3702 so as to prevent the shaft 370 from being detached from the first chassis 321.

The resisting member 308 includes a cylindrical portion 3081 and a fixing portion (not labeled) extending from the cylindrical portion 3081. The resisting member 308 is fixed to a surface of the connecting base 303. The resisting member 308 is configured to resist the roller 307.

The elastic subassembly 309 includes a spring 391, a guiding shaft 392, and the pressing block 393. The spring 391 is sleeved on the guiding shaft 392. Two ends of the guiding shaft 392 are connected to the pressing block 393 and the resisting wall 3213 of the first chassis 321 correspondingly. The pressing block 393 is substantially U-shaped. Each end of the pressing block 393 defines the holding groove 3931. The holding grooves 3931 are configured to non-rotatably latch on to each of the two latching ends 3701 of the shaft 370.

Alternatively, the guiding slots 3215 of the first chassis 321 may be replaced by a pair of guiding rails. In such cases, the restricting pole 3702 of the shaft 370 is slidably connected to the guiding rails. The pressing block 393 may be other shapes, such as a cuboid defining a holding groove.

Referring to FIGS. 2 through 5, in assembly of the elevating support 30, the roller 307 and the elastic subassembly 309 are attached to the first chassis 321 via the shaft 370 and the guiding shaft 392 of the elastic subassembly 309. The restricting pole 3702 of the shaft 370 is slidably received in each of the guiding slot 3215 of the first chassis 321. Then, ends of each side wall 3212 of the first chassis 321 and ends of each side wall 3222 of the second chassis 322 are rotatably connected to the supporting subassemblies 323.

The sleeve 352 is sleeved on the middle portion of the first pivot shaft 351. The torsion spring 353 is sleeved on the sleeve 352. Then, each opposite shaft portions of the first pivot shaft 351 is passed through the components of each first hinge subassembly such as the limiting washer 354, the first pressing washer 355, the first protecting washer 356, each of the pair of rotatable brackets 301, the second protecting washer 357, two first resilient rings 358, the first washer 359, the adjustable nut 3050, and each of the two supporting assemblies 323, in that order. The n-shaped connecting portion 3532 of the torsion spring 353 engages in the notch 3013 of each of the pair of rotatable brackets 301. The latching end 3533 of the torsion spring 353 is inserted into the latching groove 3542 of the limiting washer 354. Thus, the first pivot subassembly 305 is connected to the supporting subassemblies 323. After that, each opposite shaft portions of the first pivot shaft 351 is passed through the components of each first hinge subassembly such as the second resilient ring 3051, the second pressing washer 3052, and the second washer 3053, in that order. The nut 3055 then engages with each end of the first pivot shaft 351 correspondingly.

The resisting member 308 is sleeved on the middle portion of the second pivot shaft 361 of the second pivot subassembly 306. Then, each opposite portions of the second pivot shaft 361 is passed through the components of each second hinge subassembly such as the block 362, the side wall of the connecting base 303, a resilient ring 363, each of the two remaining supporting subassemblies 323, the resilient ring 364, the resilient washer 365, and the washer 366, in that order. The nut 367 engages with each of the distal ends of the second pivot shaft 361. As such, the other end of the bracket subassembly 302 is rotatably connected to the connecting base 303 via the second pivot subassembly 306. The resisting member 308 is fixed to the connecting base 303. The cylindrical portion 3081 of the resisting member 308 resists the roller 307.

When the stand support 102 is used for supporting a flat-panel display body, an end of the monitor bracket 50 of the stand support 102 is fixed to a display body 10 of the flat-panel display body 100, and an opposite end is fixed to the pair of rotatable brackets 301 of the elevating support 30. The connecting base 303 is fixed to the support member 20. In use, a force is applied on the display body 10 for rotating the display body 10 with the pair of rotatable brackets 301 relative to the bracket subassembly 302 along an axis of the first pivot shaft 351 of the first pivot subassembly 305, thereby adjusting the viewing angle of the flat-panel display body 100. A frictional force between the pair of rotatable brackets 301 and other components of the first pivot subassembly 305 enables the display body 10 to maintain at a desired position. An external force for rotating the pair of rotatable brackets 301 may be changed by adjusting the adjustable nuts 3050 of the first pivot subassembly 305. The restricting block 3012 of each of the rotatable brackets 301 and the restricting groove 3542 of the limiting washers 354 cooperatively restrict each of the rotatable brackets 301 in limited adjusting range. A torsion force of the torsion spring 353 either increases or decreases according to the rotation of each of the rotatable brackets 301, thereby preventing an excessive force from damaging the first pivot subassembly 305.

Figure 6:
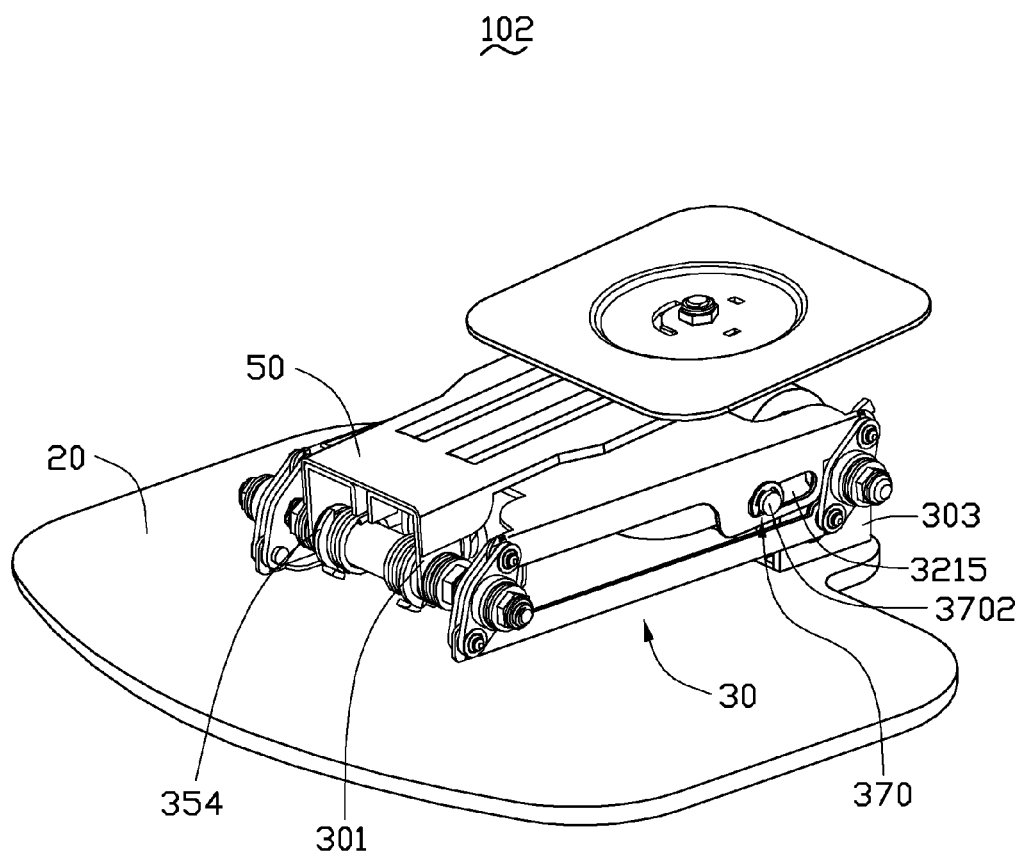
FIG. 6 is an assembled view of the stand support in FIG. 1, and showing the elevating support of the stand support rotated to a first utmost position (lowest position).

Referring to FIGS. 3 and 6, the elevating support 30 is in a first utmost position (lowest position), the restricting poles 3702 of the shaft 370 abut against the restricting holes 3215 and the restricting blocks 3012 of the rotatable bracket 301 abut against the restricting groove 3541 of the limiting washers 354, thereby restricting the rotatable bracket 301 together with the monitor bracket 50 in a minimum height. The monitor bracket 50, the elevating support 30, and the support member 20 are substantially parallel to each other, so that the package volume of the stand support 102 is decreased.

Referring also to FIGS. 1 and 2, when the height of the rotatable bracket 301 together with the display body 10 needs to increase, the display body 10 is pushed upwards so that the elevating support 30 is moved up to increase the height of the display body. During the moving of the bracket subassembly 302 of the elevating support 30, the spring 391 of the elastic subassembly 309 resists the resisting wall 3213 and the pressing block 393. A resisting force applied on the pressing block 393 indirectly acts on the connecting base 303 via the shaft 370, the roller 307, and the resisting member 308. A rebound force of the spring 391 indirectly applies on the bracket subassembly 302, so that an angle between the side walls 3212 of the first chassis 321 and the supporting subassemblies 323 connected to the connecting base 303 has a tendency of becoming larger. In other words, a distance between the first chassis 321 and the second chassis 322 has a tendency of becoming smaller. The bracket subassembly 302 always has a tendency of elevating. In addition, the rebound force of the spring 391 indirectly acted on the bracket subassembly 302 partially balances a gravitational force acting on the display body 10. When the display body 10 is lifted to a predetermined height, the display body 10 can be stably maintained at the predetermined height by frictional forces created by the first chassis 321, the second chassis 322, the supporting assemblies 323, and the second pivot subassembly 306.

When an external force is applied on the display 10 to make the rotatable brackets 301 rotate relative to the first pivot shaft 351 of the first pivot subassembly 305, the viewing angle of the display body 10 is adjusted. When the external force is released, frictional forces between the rotatable bracket 301 and components of the first pivot subassembly 305 enable the display body 10 to retain in a desired position.

In alternative embodiments, the elastic subassembly 309 may be omitted. In such cases, a torsion spring is disposed between the side wall 3212 of the first chassis 321 and the supporting subassembly 323. The torsion spring is sleeved on the second pivot shaft 361. Two ends of the torsion spring are fixed to the side wall 3212 of the first chassis 321 and the supporting subassembly 323 correspondingly, and the torsion spring is compressed between the first chassis 321 and the supporting subassembly 323 connected to the connecting base 303. The torsion spring is capable of exerting a rebound force on the side wall 3212 of the first chassis 321 and the supporting subassembly 323. The angle between the side walls 3212 of the first chassis 321 and the supporting subassemblies 323 has a tendency of becoming larger. Therefore, the distance between the first chassis 321 and the second chassis 322 has a tendency of becoming smaller. The rebound force of the torsion spring partially balances the gravitational force acting on the display body 10. Alternatively, the torsion spring may be replaced by a compression spring with two rings formed at distal ends. The two rings of the compression spring are fixed to the side wall 3222 of the second chassis 322 and the supporting subassembly 323 correspondingly.

Figure 7:
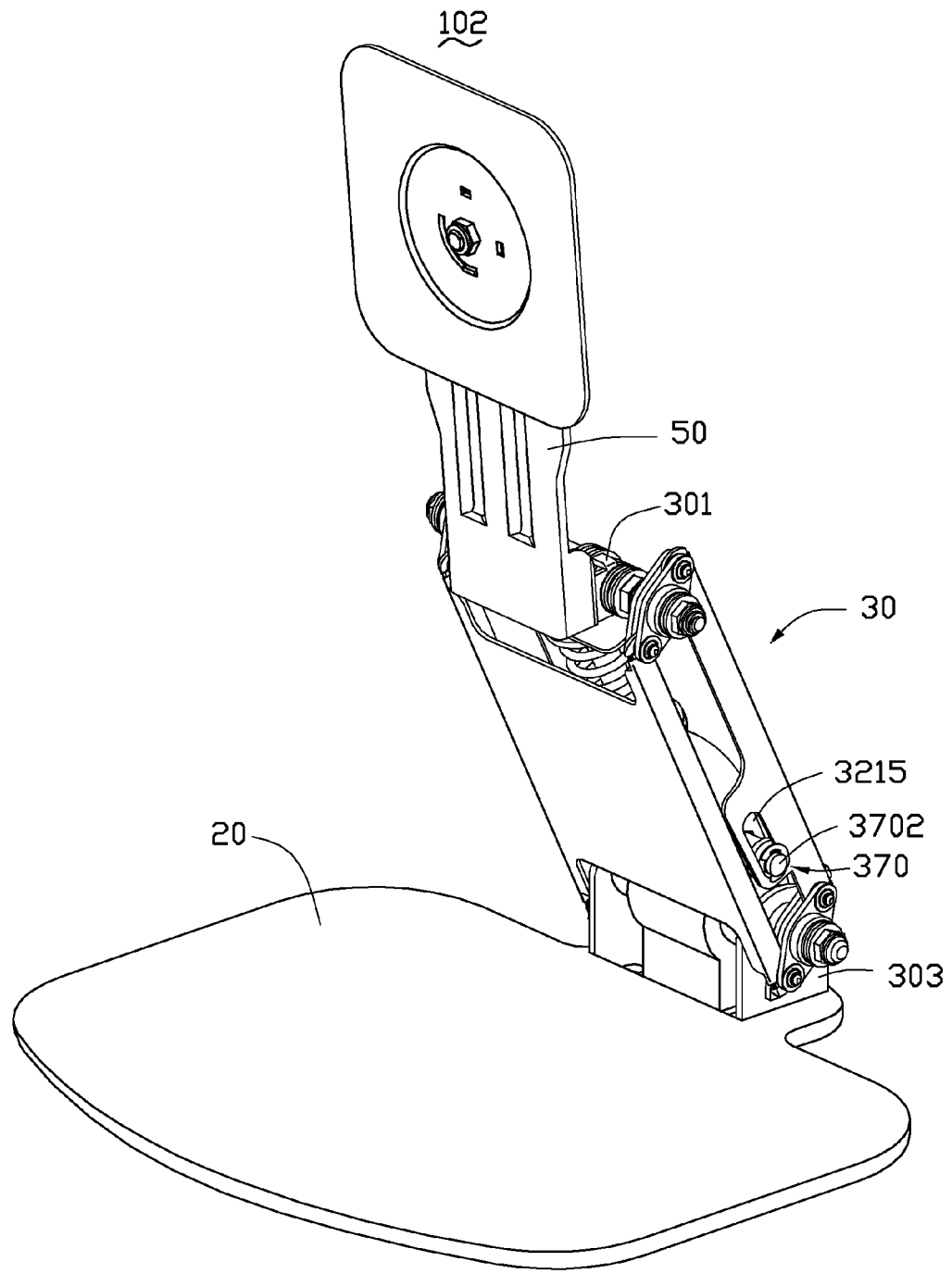
FIG. 7 is similar to FIG. 6, but showing the elevating support of the stand support rotated to a second utmost position (highest position).

Referring to FIGS. 3 and 7, the elevating support 30 is in a second utmost position (highest position), the restricting poles 3702 of the shaft 370 abut against the restricting holes 3215 and the restricting blocks 3012 of the rotatable bracket 301 abut against the restricting groove 3541 of the limiting washers 354, thereby restricting the rotatable bracket 301 together with the monitor bracket 50 in a maximum height.

A torsion force of the tension spring 353 either increases or decreases according to the motion of the elevating support 30, thereby further preventing an excessive force from damaging the elevating support 30. Therefore, the usage life of the elevating support 30 is prolonged. Further, the first and second utmost positions are restricted by the restricting poles 3702 abutting against the restricting grooves 3215 and the restricting blocks 3012 abutting against the restricting groove 3541, thus the elevating support 30 is effectively restricting between the first utmost position to the second utmost position. In other words, the display body can be adjusted between the minimum height and the maximum height.

Figure 8:
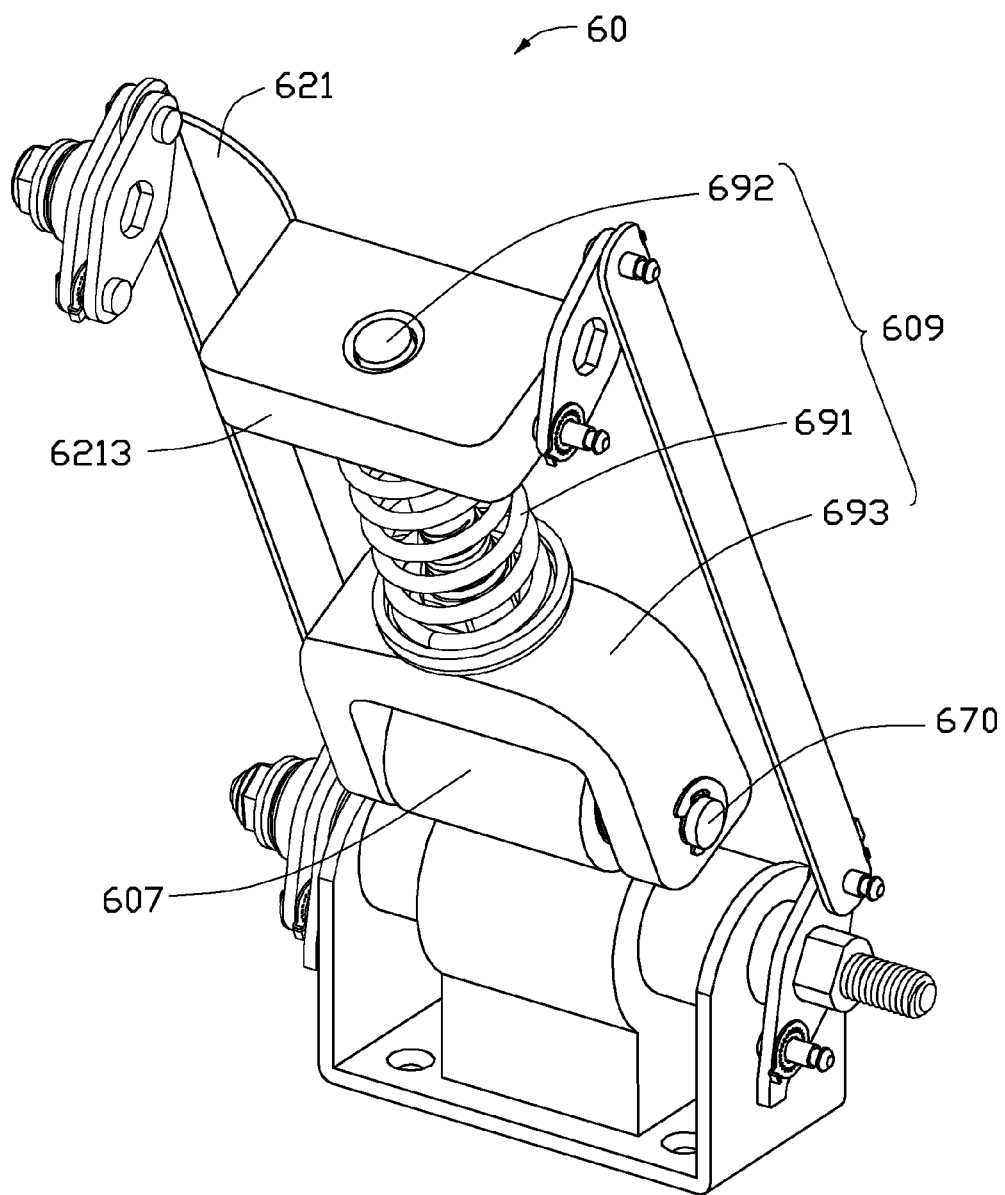
FIG. 8 is a partially assembled, isometric view of an elevating support in accordance with a second exemplary embodiment of the present invention.

Referring to FIG. 8, in a second exemplary embodiment, an elevating support 60 is similar in principle to the elevating support 30 except the following differences. Firstly, a resisting wall 6213 of a first chassis 621 is a cuboid block. Secondly, an elastic subassembly 609 includes a spring 691, a guiding shaft 692, and a pressing block 693. Each end of the pressing block 693 defines a shaft hole (not labeled) for inserting a shaft 670. A roller 607 is rotatably disposed between two ends of the pressing block 693 via the shaft 670. In such conditions, two side walls of the first chassis 621 do not define guiding slots.

Figure 9:
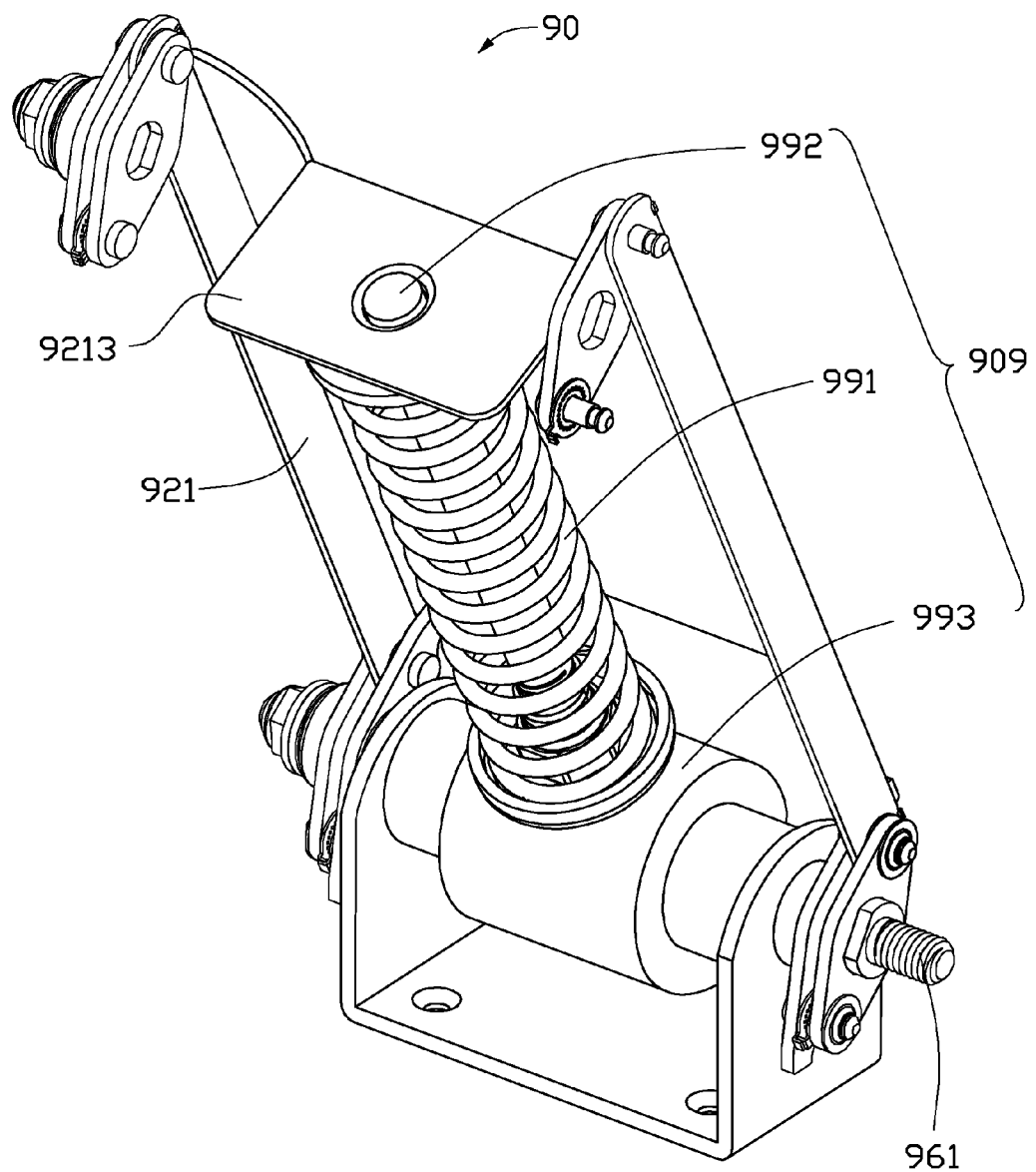
FIG. 9 is a partially assembled isometric view of an elevating support in accordance with a third exemplary embodiment of the present invention.

Referring to FIG. 9, an elevating support 90 in accordance with a third exemplary embodiment is shown. The elevating support 90 is similar in principle to the elevating support 30 except the following differences. Firstly, an elastic subassembly 909 of the elevating support 90 includes a spring 991, a guiding shaft 992, and a shaft sleeve 993. The spring 991 is sleeved on the guiding shaft 992. Two ends of the spring 991 resist a resisting wall 9213 of a first chassis 921 and the shaft sleeve 993 respectively. Two ends of the guiding shaft 992 are connected to the shaft sleeve 993 and the resisting wall 9213 of the first chassis 921. Secondly, the shaft sleeve 993 is sleeved on a second pivot shaft 961 of a second pivot subassembly. The elevating support 90 does not include a roller, a shaft extending through the roller, a resisting member, and two guiding slots defined in the first chassis 921.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A support stand for a flat-panel display body, comprising:
    an elevating support, comprising a first chassis, a second chassis, a first plurality of supporting blocks and a second plurality of supporting blocks, an elastic member, a first pivot subassembly, and a second pivot subassembly; wherein the elastic member is capable of exerting a rebound force on at least two of the first chassis, the second chassis, the first and the second pluralities of supporting blocks to make the first chassis and the second chassis tend to elevate, the first pivot subassembly is fixed to the first plurality of supporting blocks which are connected to a first end portion of the first chassis and a first end portion of the second chassis, and the second pivot subassembly is fixed to the second plurality of supporting blocks which are connected to a second end portion of the first chassis and a second end portion of the second chassis;
    a monitor bracket rotatably connected to the first pivot subassembly; and
    a support member rotatably connected to the second pivot subassembly;
    wherein the elevating support further comprises a resisting member, a roller and a pressing block; the resisting member is rotatably connected to the second plurality of supporting blocks, the roller is rotatably assembled with the pressing block and rotatably abut against the resisting member;
    wherein the first chassis comprises a resisting wall formed on the first end portion thereof opposite to the second pivot subassembly; the elastic member is disposed between the resisting wall and the pressing block, and two ends of the elastic member resist the resisting wall and the pressing block correspondingly;
    wherein the elevating support further comprises a connecting base and a guiding shaft, the connecting base is rotatably connected to the second plurality of supporting blocks together with the resisting member; the resisting member is disposed within the connecting base; two ends of the guiding shaft are connected to the pressing block and the resisting wall of the first chassis correspondingly; the elastic member is sleeved on the guiding shaft;
    wherein, the pressing block is substantially U-shaped, each end of the pressing block defines a shaft hole, the roller is rotatably positioned between two side walls of the pressing block by a shaft through each of the shaft holes, and the roller is rotatable relative to the resisting member.

2. The support stand as claimed in claim 1, wherein the resisting wall of the first chassis defines a through hole, a top end of the guiding shaft is inserted into the through hole, an opposite bottom end of the guiding shaft is fixed to the pressing block.

3. The support stand as claimed in claim 1, wherein the first pivot subassembly comprises a pivot shaft, and a plurality of rotatable brackets; each of the plurality of rotatable brackets is rotatably sleeved on the pivot shaft.

4. The support stand as claimed in claim 1, wherein the first pivot subassembly includes a first pivot shaft, a sleeve sleeved on the first pivot shaft, a torsion spring sleeved on the sleeve, and two first hinge subassemblies attached to opposite shaft portions of the first pivot shaft.

5. The support stand as claimed in claim 1, wherein the first chassis further comprises a flat base and two side walls extending from opposite sides of the flat base, the resisting wall is a cuboid block extending from a top end of the flat base away from the connecting base, and perpendicularly relative to the two side walls and positioned between the two side walls.

6. The support stand as claimed in claim 4, the support stand further comprises a pair of rotatable brackets, the pair of rotatable brackets are rotatably connected to the first end portion of the first chassis via the first pivot subassembly.

7. The support stand as claimed in claim 4, wherein the first pivot subassembly further comprises two limiting washers oppositely sleeved on the shaft portion of the first pivot shaft and positioned adjacent to two ends of the torsion spring; each of the two limiting washers defines a restricting groove and a latching groove on a periphery; each of the plurality of rotatable brackets comprises a restricting block, and a notch; the torsion spring comprises two torsion portions, an n-shaped connecting portion connected to the each of the two torsion portions; each of the two torsion portions comprises a latching end, wherein the n-shaped connecting portion engages in the notch, each latching end is inserted into the latching groove of each of the two limiting washers.

8. The support stand as claimed in claim 7, wherein the second pivot subassembly comprise a second pivot shaft and two second hinge subassemblies, a shaft sleeve is sleeved on a middle portion of the second pivot shaft; the second hinge subassemblies are attached to opposite shaft portions of the second pivot shaft.

9. An elevating support for a support stand of a flat-panel display body, the elevating support comprising:
a first chassis including end portions;
a second chassis including end portions;
a plurality of supporting blocks for connecting the end portions of the first chassis and the second chassis;
an elastic member, the elastic member being capable of exerting a rebound force on at least two of the first chassis, the second chassis, and the supporting blocks to make the first chassis and the second chassis tend to elevate;
a first pivot subassembly fixed to the plurality of supporting blocks which are connected to a first end portion of the first chassis and a first end portion of the second chassis;
a second pivot subassembly fixed to the plurality of supporting blocks which are connected to a second end portion of the first chassis and second end portion of the second chassis;
at least one rotatable bracket rotatably connected to the first pivot subassembly; and
a connecting base rotatably connected to the second pivot subassembly;
wherein the elevating support further comprises a resisting member, a roller and a pressing block, the resisting member is disposed within the connecting base and is rotatably connected to the plurality of supporting blocks connected the second end portions of the first chassis and the second chassis, the roller is rotatably assembled with the pressing block and rotatably abut against the resisting member;
wherein the first chassis comprises a resisting wall formed on the first end portion thereof opposite to the second pivot subassembly; the elastic member is disposed between the resisting wall and the pressing block, and two ends of the elastic member resist the resisting wall and the pressing block correspondingly;
wherein the elevating support further comprises a guiding shaft, two ends of the guiding shaft are connected to the pressing block and the resisting wall of the first chassis correspondingly; the elastic member is sleeved on the guiding shaft;
wherein the resisting wall of the first chassis defines a through hole, a top end of the guiding shaft is inserted into the through hole, an opposite bottom end of the guiding shaft is fixed to the pressing block;
wherein the pressing block is substantially U-shaped, each end of the pressing block defines a shaft hole, the roller is rotatably positioned between two side walls of the pressing block by a shaft through each of the shaft holes, and the roller is rotatable relative to the resisting member.

10. The elevating support as claimed in claim 9, wherein the first pivot subassembly comprises a pivot shaft, and two limiting washers; each of the limiting washers defines a restricting groove; the at least one rotatable bracket comprises two rotatable brackets, each of the two rotatable brackets is sleeved on the pivot shaft, each of the two rotatable brackets comprises a restricting block, and the restricting block and the restricting groove cooperatively restrict each of the two rotatable brackets in limited adjusting range.

11. The elevating support as claimed in claim 10, wherein the first pivot subassembly further comprises a torsion spring and a sleeve, the sleeve is sleeved on the pivot shaft, the torsion spring comprises two torsion portions and an n-shaped connecting portion connected to each of the two torsion portions, each of the two torsion portions comprises a latching end for abutting against each of the two limiting washers, and the n-shaped connecting portion is fixed to each of the two rotatable brackets.

12. The elevating support as claimed in claim 9, wherein the first pivot subassembly includes a first pivot shaft, a sleeve sleeved on the first pivot shaft, a torsion spring sleeved on the sleeve, two first hinge subassemblies attached to opposite shaft portions of the first pivot shaft, and the torsion spring is configured to change length in response to a rotation of the least one rotatable bracket, thereby preventing an excessive force from damaging the first pivot subassembly.

* * * * *